UNITED STATES PATENT OFFICE.

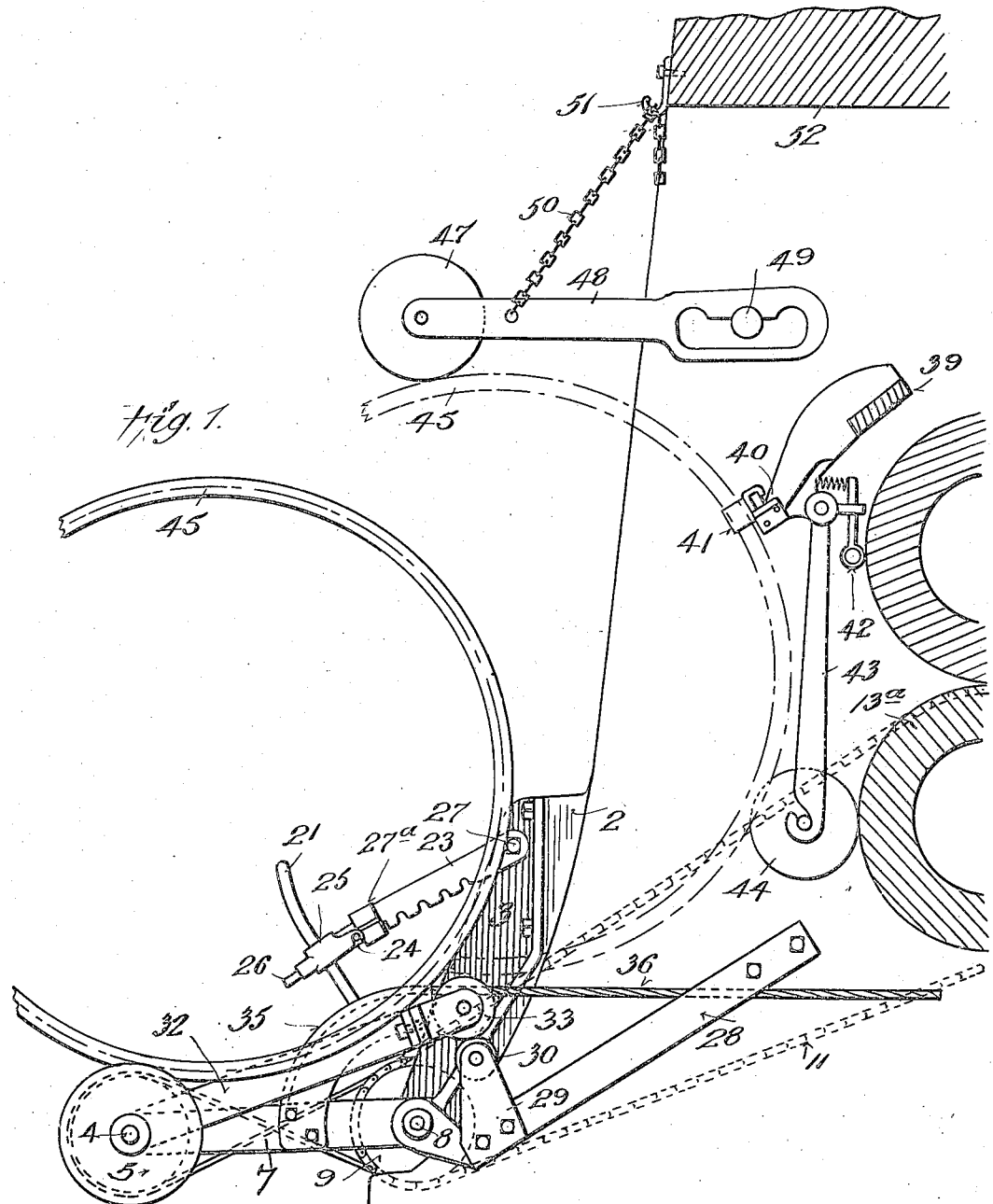

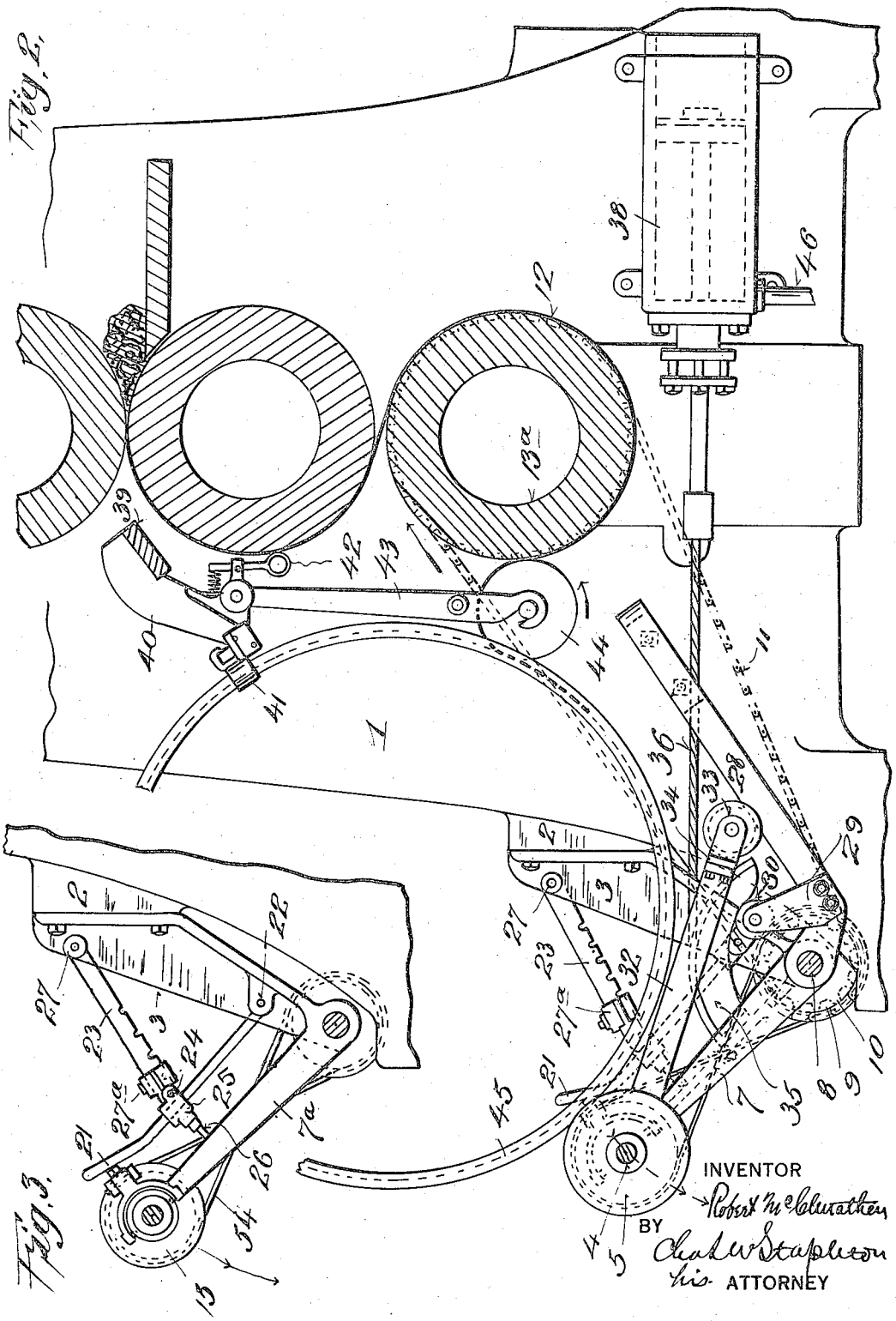

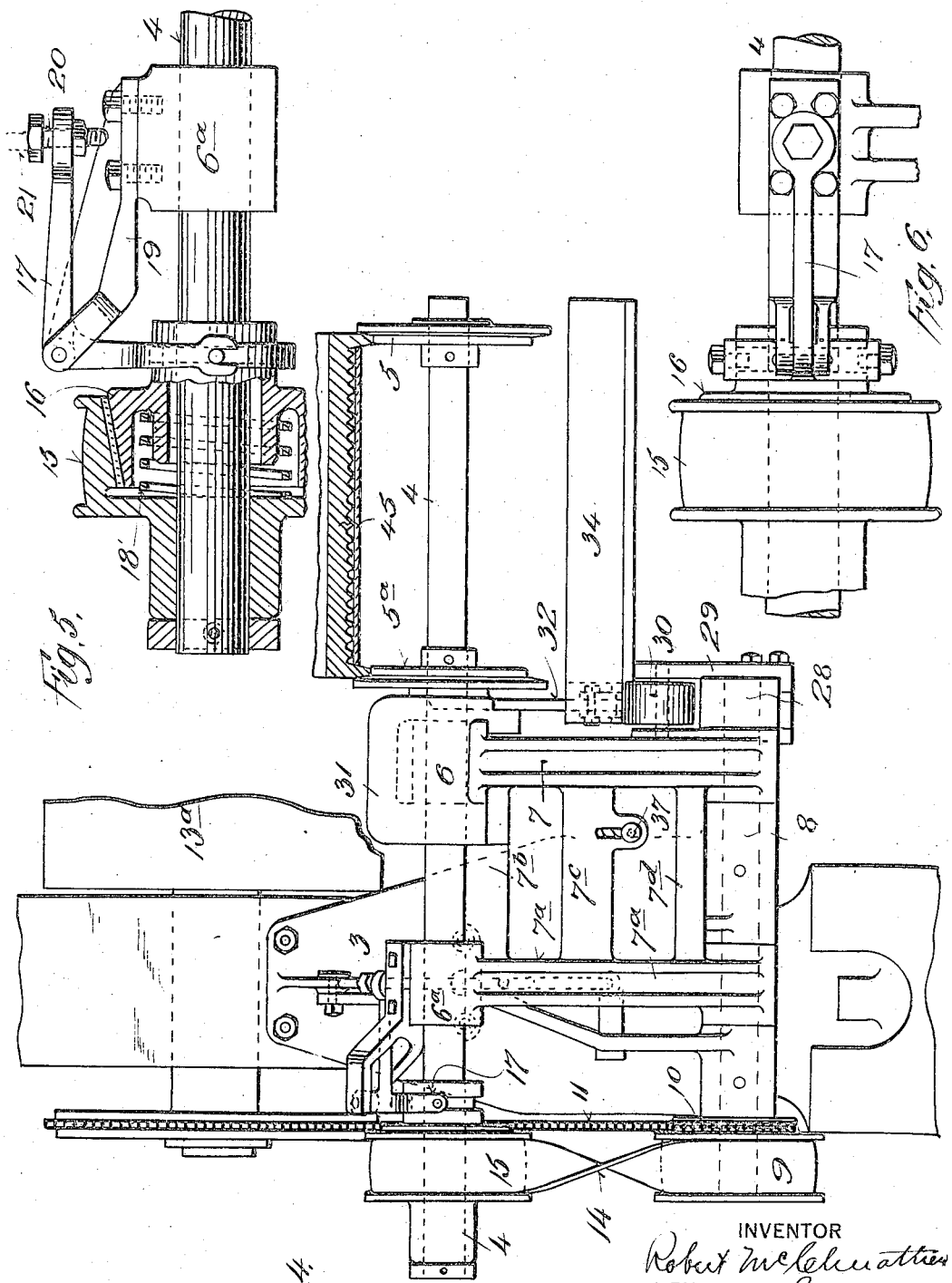

ROBERT McCLENATHEN, OF CUYAHOGA FALLS, OHIO, ASSIGNOR TO KELLY SPRINGFIELD TIRE CO.

RUBBER-TIRE-BUILDING MACHINE.

1,380,667.  Specification of Letters Patent.  Patented June 7, 1921.

Application filed June 23, 1920. Serial No. 391,097.

*To all whom it may concern:*

Be it known that I, ROBERT MCCLENATHEN, a citizen of the United States, residing at Cuyahoga Falls, county of Summit, and State of Ohio, have invented new and useful Improvements in Rubber-Tire-Building Machines, of which the following is a specification.

My invention relates to a machine for forming, or making what is known as solid rubber tires. These tires of the larger type, such as are used on trucks and vehicles intended for heavy loads, are usually held in place on the metal tire rim by adhesion only and usually consist of two distinctly different rubber compounds, a hard base part or section having the characteristics of gutta percha and commonly referred to in the rubber tire industry as "vulcanite," and a more resilient outer part or section constituting the tread portion. The hard part is vulcanized directly to the metal tire rim and the tread is vulcanized to the hard part, as it has been found that vulcanizing the softer rubber directly to the metal rim frequently results in imperfect or weak adhesion while the vulcanite unites freely and tenaciously to the metal rim and the tread stock will unite firmly and tenaciously to the vulcanite.

Both the hard base of vulcanite (which is soft before vulcanizing) and the softer tread part are usually built up of superimposed layers of thin continuous strips of unvulcanized materials simultaneously as these materials are squeezed out between the rollers of the ordinary rubber calender and cut to the proper width on the calender roll.

This building up of the tire really consists of two separate operations as both vulcanite and tread stock cannot be supplied by the calender in a continuous operation; there are usually involved two calenders, one supplying vulcanite and the other tread stock, and in any event a double handling of the rims is necessary, and as these rims, for the larger sizes, frequently weigh several hundred pounds facilities for handling them become important, a block and tackle has been used for this purpose but this is a crude process and takes much unnecessary time.

With the machine described herein the workman merely rolls the rim on to carrying rollers which are depressed for the purpose, pulls a lever which sets a hydraulic cylinder in operation which raises the rim into position where it is revolved and receives the strips of material, after which the lever is reversed when the rollers and rim settle back to the original position, the rim with its load of material is rolled away, another rim placed in position and the operation repeated.

The principal objects of the invention are to save time and labor in the handling of the rims; to revolve the rim in its proper position and to provide the proper pressure on each strip as it goes into the tire.

The machine here shown really amounts to an improvement on the machine covered by U. S. Letters Patent No. 1,312,491 granted to me August 5, 1919, as it will be clear that many parts of the device there shown may be used in connection with the machine described in this application and also that the pressure roller of special design or formation shown in my application filed October 10, 1919, Serial No. 329,858 may also be so used.

The advantages of the machine covered in this application will be apparent in the handling of the heavier rims.

In the accompanying drawings,—

Figure 1,— is a right hand view of the principal parts of the machine from the position of the operator and in its depressed position ready to receive the wheel rim, and is attached to the ordinary rubber calender.

Fig. 2,—is also a right hand view of the machine with additional parts and in its elevated position ready to receive the unvulcanized rubber.

Fig. 3,— shows some details of the automatic starting mechanism.

Fig. 4,— is substantially an underside plan view of the machine.

Fig. 5,— shows detail of clutch mechanism and automatic starting mechanism.

Fig. 6,— is a top view of the clutch and starting mechanism.

Like numerals refer to like parts throughout the several views.

To a common calender standard 1 carrying a boss 2 is bolted supporting bracket 3. To driven shaft 4 is attached laterally adjustable carrying roller 5 and its companion rigidly attached carrying roller $5^a$, (best shown in Fig. 4). Shaft 4 is revolubly supported by bearings 6, $6^a$, which bearings are an integral part of a tilting or rocking frame consisting of arms 7, $7^a$, and integral cross bars $7^b$, $7^c$, $7^d$, which frame tilts or rocks on stationary shaft 8. On shaft 8 is located driving pulley 9 to which is rigidly attached driven sprocket 10, said sprocket being driven by chain 11 and sprocket 12, (best shown in Fig. 2) which last named sprocket is keyed to shaft 13 of calender roll $13^a$; shaft 4 is driven by twisted belt 14 operating on clutch pulley 15, which clutch pulley operates shaft 4 by means of slidable clutch cone 16, (best shown in Fig. 5) and which clutch cone is automatically controlled by the movement of bell crank 17 and coil spring 18. Bell crank 17 is supported by bracket 19 which is rigidly attached to bearing $6^a$. Bell crank 17 carries adjustable screw 20 which contacts with adjustable arm 21 when the tilting frame is raised to the desired height, and which arm 21 is pivotally attached to supporting bracket 3 by pin 22 and held in adjusted position by notched arm 23, which arm hooks on to pin 24 in clamp 25 which clamp also carries stop pin 26 which pin contacts with the arm $7^a$ of the tilting frame when that arm is in a raised position. Notched arm 23 is pivotally attached to bracket 3 by pin 27 and carries adjustable clamp $27^a$.

To calender standard 1 is securely fastened one end of bracket 28, the other end thereof being rigidly fastened to shaft 8. To bracket 28 is also rigidly attached bearing bracket 29 which supports roller 30. Pivotally mounted on shaft 4 is bearing bracket 31 to which is attached arm 32, which arm carries roller 33 in position to run on bracket 28; extending at right angles to arm 32, and rigidly attached thereto is rim supporting arm 34.

Rigidly mounted on cross bar $7^c$ is sheave segment 35 over which passes wire cable 36, one end of which extends through cross bar $7^c$ and is held in position by clamp 37. This cable is operated by hydraulic cylinder 38. Supported by bar 39 which is rigidly attached to the calender standards 1, is bracket 40 which bracket carries a pair of adjustable guide rollers 41 and a pair of adjustable cutting knives 42; bracket 40 also carries pivotally mounted pendant frame 43 which carries on its lower end pressure roller 44, operated by contact with the rubber strip on calender roll $13^a$ and the tire rim 45, which roller serves to press the unvulcanized rubber firmly in the tire rim 45. Hydraulic cylinder 38 is operated by the ordinary lever and valve, (not shown in the drawing) which connect with pipe 46.

Pressure roller 47 is held in position laterally by adjustable arm 48 which arm is supported by rod 49 extending between, and fastened to the calender standards; chain 50 connects with hook 51 which hook is attached to the calender cross head 52.

The operation is as follows:—The tilting frame with its attachments being depressed and resting on the floor as shown in Fig. 1, the workman rolls the tire rim on to carrying rollers 5, $5^a$ and over until it rests also on supporting arm 34. Hydraulic cylinder 38 is then set in operation by the ordinary lever and valve (neither of which is shown in the drawings) this pulls cable 36 over sheave segment 35 and elevates the outside of the tilting frame, which with all its attachments, turns on stationary shaft 8.

During the operation the roller 33 on arm 32 passes from roller 30 down on to bracket 28 to the position shown in Fig. 2, so that the rim then rests on rollers 5, $5^a$, and against pressure roller 44. The tilting operation brings the screw 20 into contact with adjustable arm 21 which operates bell crank 17 closing clutch 16 thus causing shaft 4 and guide rollers 5, $5^a$ to revolve and which revolves the tire rim 45 while in the elevated position shown in Fig. 2. As the wheel rim revolves the strip of rubber which has been cut by the knives 42 is led from calendar roll $13^a$ over pressure roller 44 and on to the tire rim to which, being sticky, it adheres. The tire rim continues to revolve until the desired thickness of material has been laid down thereon after which the strip of material is severed, the valve operating hydraulic cylinder 38 opened by reversing the lever hereinbefore mentioned which permits the tilting frame with its attachments and the tire rim to settle back to its original position as the water slowly escapes from the cylinder 38. The tire rim with its load of material is then rolled away and the machine is in position to handle another rim.

It will be understood that a considerable amount of pressure is required in laying down the thin strips of material, to exclude air bubbles and blisters, which always abound, thus the rim must at all times be firmly pressed against the roller 44, and to insure a sufficient and constant pressure, the comparatively heavy solid roller 47 is adjusted to bear on the upper portion of the revolving rim for this purpose.

It will be understood that the tilting or rocking frame might consist of a solid arm performing the same function, also that the carrying rollers 5, $5^a$, might be combined into a single roller without departing from the spirit of the invention.

While I prefer to use hydraulic pressure as the operating power, this is not essential, as it will be apparent that the machine can be operated by other well known means and I do not limit myself to hydraulic operation.

Having now described my invention I claim,—

1. In a machine of the character described, mounted rim carrying rollers adapted to be raised and lowered while carrying a tire rim, means to revolve said rollers and to raise and lower said rollers and rim.

2. In a machine of the character described, a shaft having mounted thereon rim carrying rollers, said shaft and rollers adapted to be raised and lowered while carrying a tire rim, means to revolve and to raise and lower said shaft, said rollers and said rim simultaneously.

3. In a machine of the character described, a shaft having mounted thereon rim carrying rollers, said shaft and rollers adapted to be raised and lowered while carrying a tire rim, means to raise and lower said shaft, said rollers and said rim, means to revolve said rollers, and to revolve said rim by friction contact with said rollers.

4. In a machine of the character described, a horizontally mounted revoluble shaft adapted to be raised and lowered, rim carrying rollers attached thereto, means to raise and lower said shaft and rollers while carrying a tire rim, means to revolve said shaft, rollers and rim, means to feed a strip of sheeted rubber to said rim and to press said rubber upon said rim as said rim revolves.

5. In a machine of the character described, a horizontally mounted stationary shaft, a horizontally mounted revoluble shaft connected with said stationary shaft, a pair of rim carrying rollers attached to said revoluble shaft, said revoluble shaft and attached rollers adapted to be raised and lowered and to carry a revolving tire rim, means to revolve said revoluble shaft and said attached rollers and to revolve said tire rim by friction contact with said rollers, means to feed a strip of sheeted rubber to said tire rim and to press said strip of rubber upon said rim as said rim revolves.

6. In a machine of the character described, a horizontally mounted stationary shaft, a horizontally mounted revoluble shaft connected with said stationary shaft by tiltable arms, a pair of rim carrying rollers attached to said revoluble shaft, said revoluble shaft and attached rollers adapted to be raised and lowered by tilting said arms while carrying a tire rim, means to tilt said arms, means to revolve said revoluble shaft and attached rollers, and to revolve said rim by friction contact with said rollers, means to feed a strip of sheeted rubber to said tire rim and to wind up the rubber on said rim as said rim revolves.

7. In a machine of the character described, a stationary portion and a movable portion attached thereto by connecting arms, said movable portion having a revoluble shaft, carrying rollers, rim supporting arms and an engagement clutch, said movable portion being adapted to a tilting movement, means to tilt said movable portion and to revolve said carrying rollers while supporting a revolving tire rim.

8. In a machine of the character described, a stationary portion and a movable portion attached thereto by connecting arms and adapted to turn on said stationary portion, said movable portion consisting of a revoluble shaft, a pair of carrying rollers, rim supporting arms, a clutch pulley and engagement clutch, a sheave segment means to operate said segment and clutch and to tilt said movable portion, means to revolve said revoluble shaft, carrying rollers and a tire rim by friction contact with said carrying rollers.

9. In a machine of the character described, a tiltable arm having one end thereof attached to and adapted to turn on a fixed bearing, the other end of said arm carrying a shaft revolubly mounted therein, a rim carrying roller mounted on said shaft means to raise and lower said shaft and roller by tilting said arm, means to revolve said roller while carrying a tire rim, a pressure roller interposed between said tire rim and the roll of a rubber calender, means to hold said tire rim and pressure roller in place and to revolve the same in juxtaposition to the roll of said rubber calender.

10. In a machine of the character described, tiltable bearing arms each arm having one end attached to and adapted to turn upon a fixed bearing, the other ends of said arms adapted to be elevated or depressed and carrying a shaft revolubly mounted therein, a clutch pulley, a sheave segment, a rim bearing arm and rim carrying rollers attached to said movable shaft, means to elevate and depress said movable shaft with the attached clutch pulley, sheave segment, rim bearing arm and rim carrying roller while carrying a tire rim, means to automatically close said clutch pulley upon the elevation of said shaft, and to automatically open said clutch pulley upon the depression of said shaft, means to revolve said rim carrying rollers and tire rim, means to feed a strip of sheeted rubber to said tire rim and deposit the same thereon while said rim revolves, a pressure roller adapted to press a strip of sheeted rubber upon said tire rim as said rim revolves, and means to revolve said pressure roller.

11. In a machine of the character described, a horizontally mounted stationary shaft and a horizontally mounted revoluble shaft, said shafts connected by tiltable arms, one end of each arm hinged upon said stationary shaft and adapted to turn thereon, the other ends of said arms constituting bearings for and supporting said revoluble shaft, a pair of rim carrying rollers mounted on said revoluble shaft, means to tilt said arms, to revolve said revoluble shaft. and said rollers while carrying a revolving tire rim in juxtaposition to a calender roll, means to feed a strip of sheeted rubber to said tire rim while said rim revolves, a pressure roller interposed between the calender roll, and the tire rim and adapted to press said strip of rubber upon said tire arm as said rim revolves.

ROBERT McCLENATHEN.